3,454,390
PROCESS FOR DESICCATING PLANTS
Herbert Q. Smith, King of Prussia, Pa., assignor to Pennsalt Chemicals Corporation, Philadelphia, Pa., a corporation of Pennsylvania
No Drawing. Continuation-in-part of application Ser. No. 575,555, Aug. 29, 1966. This application Jan. 16, 1968, Ser. No. 698,132
Int. Cl. A01n 5/00
U.S. Cl. 71—70     7 Claims

ABSTRACT OF THE DISCLOSURE

Process for disiccating plants using as active agent a hexalkylditin of structure $(R)_3$—Sn—Sn—$(R)_3$ where R is an alkyl group containing one to six carbon atoms.

---

This is a continuation-in-part of Ser. No. 575,555 filed Aug. 29, 1966, now U.S. Patent 3,397,052.

In accord with the invention, the desiccation of plants is obtained by contacting them with a desiccating amount of a hexaalkylditin having the structure $$(R)_3\text{—Sn—Sn—}(R)_3$$

where R is a lower alkyl group containing from 1 to 6 carbon atoms. It will be understood that the R groups in the above formula may be the same or different.

It is surprising that this limited class of ditins is active as plan desiccants since related ditins are inactive. For example, when R is an alkyl group containing 8 carbon atoms, or if R is an aryl group such as phenyl, the corresponding ditins are inactive.

The compounds of the above structure are known compounds, and are prepared in accordance with the procedures set forth by G. Gruttner, Chem. Ber. 50, 1808 (1917), or by other known methods.

The compounds will be used as indicated above for post-emergent disiccant use. The active compounds will be used at desiccant concentrations which will generally range from about 1 to 10 pounds per acre, the preferred concentrations being about 2 to 5 pounds per acre. The active concentrations may be used without damaging or destroying the crops and yet achieve excellent desiccant effects. The active compounds may be formulated in various ways, but preferably a dispersion of the active ingredients in an aqueous system will be prepared for application and use. In general, the compound will first be dissolved in organic solvents such as diacetone alcohol, xylene, ethylene glycol, diacetone alcohol, methanol, ethanol and the like, and added to water to prepare the water dispersions. Surfactants may or may not be present as desired. Also, suitable water dispersion concentrates may be prepared by ball milling the solid material in water with suitable wetting and suspending agent such as lignin sulfonate, bentonite, etc. Alternatively, solutions of the agents in organic solvents may be employed for use under field conditions.

Compositions may also be prepared as emulsion concentrates for dilution with water in field application. Concentrates may be prepared with the use of suitable solvents such as xylene, isophorone, heavy aromatic naphtha, methylated naphthalene and the like with the addition of suitable emulsifying agents.

Wettable powders of the reactive agent may also be prepared by direct grinding of the dry compound with a blend of a suitable dispersing agent such as attapulgite, bentonite, kieselguhr, etc. It is desired to grind such a blend in a hammer mill so that 99% will pass through a 325 mesh screen. Wettable powders may also be prepared by absorbing a solution of the compound in a solvent such as xylene or acetone on a powder of granular clay such as attapulgite or diatomaceous earth. All wettable powder preparations should contain a dispersing agent such as a lignin sulfonate with a wetting agent such as an alkyl aryl polyetherglycol.

The active compounds of the invention may also be used to formulate granules containing 5 to 20% concentration of active ingredient. The user may make application by use of the granular applicator rather than a duster or sprayer and known methods in commercial use are applicable for the preparation of granular formulations.

In general, formulated compositions will contain from about 1% to about 90% by weight of the active agent and the use of the compounds and their formulation will be carried out in the usual fashion.

The compounds of the invention and their formulations may be used as harvest aid chemicals which will either desiccate and/or defoliate green leaves on susceptible crops and also desiccate any weeds which may be present in order to facilitate the mechanical harvesting with a combine in the case of seed crops.

EXAMPLE I

A wettable powder was prepared containing 25% by weight of hexamethylditin as active agent, 58.2% fuller's earth, 8.4% sodium lignosulfonate wetting agent. The formulation was sprayed onto plants of 4″ to 8″ in height growing in greenhouse flats and 60% desiccation of lambsquarter and Amaranthus and 80% desiccation on sugar beets was observed at 4 pounds per acre.

EXAMPLE II

A formulation of 10% by weight of hexaethylditin in xylene (85%) containing a surfactant (5% "triton" X-155) was dispersed in with water to make an emulsion. Desiccation effects on alfalfa weer obtained at one pound per acre.

EXAMPLE III

Hexapropylditin was formulated to give a 10% by weight solution in diacetone alcohol (85%) containing 5% surfactant ("Triton" X-161), and this was subsequently diluted with water for spraying plants.

At 2 pounds per acre 100% desiccation of sugar beets was obtained and at 4 pounds per acre, 100% desiccation of Amaranthus and lambsquarter was observed.

EXAMPLE IV

In a test with an aqueous dispersion made from a formulation of 10% hexabutylditin in xylene (85%) containing surfactant (5% "Triton" X-155), Black Valentine beans were desiccated, 100% in one day at 1 pound per acre, and 100% in two days at 0.1 pound per acre.

In a similar test with the same hexabutylditin formulation diluted in an essentially non-phytotoxic hydrocarbon oil instead of water, treatment of Black Valentine beans at 1.0 pound per acre caused 100% desiccation in one day, and 100% desiccation in two to three days at 0.1 pound per acre.

EXAMPLE V

A formulation of 10% hexaisobutylditin in xylene (42.5%) and diacetone alcohol (42.5%) containing surfactant (5% "Triton" X-101) was sprayed on various plants at four pounds per acre. Desiccation of 100% on sugar beets, 90% on cotton, and 70% on soybeans was observed.

EXAMPLE VI

A 10% by weight concentration of hexaamylditin in diacetone alcohol formulated as in Example V was applied to sugar beets at 10 pounds per acre and 100% desiccation was obtained.

EXAMPLE VII

A 10% by weight formulation of hexaoctylditin in xylene (85%) and containing surfactant (5% "Triton" X–155) was sprayed on Black Valentine bean plants at 0.1, 1.0, and 10 pounds per acre, but showed no desiccation effects.

EXAMPLE VIII

A 5% by weight formulation of hexaphenylditin ball milled with water (94%) and surfactant (1% "Triton" X–155) was sprayed on Black Valentine bean plants at 0.1, 1.0, and 10 pounds per acre, but no desiccation was observed.

It will be understood from the above examples that only the lower alkyl ditins as set forth in the invention are active desiccants.

It will be understood that numerous variations and changes may be made from the above description of the invention without departing from its spirit and scope.

I claim:

1. A process for desiccating plants without destroying said plant which comprises contacting plants with a desiccating amount of hexaalkylditin of structure $$(R)_3-Sn-Sn-(R)_3$$

where R is an alkyl group containing from one to six carbon atoms.

2. The process of claim 1 wherein the active agent is hexamethylditin.
3. The process of claim 1 wherein the active agent is hexaethylditin.
4. The process of claim 1 wherein the active agent is hexapropylditin.
5. The process of claim 1 wherein the active agent is hexabutylditin.
6. The process of claim 1 wherein the active agent is hexaisobutylditin.
7. The process of claim 1 wherein the active agent is hexaamylditin.

References Cited

UNITED STATES PATENTS 3,311,649   3/1967   Molt et al. _____ 71—97

JAMES O. THOMAS, JR., *Primary Examiner.*